United States Patent
Henzler

(10) Patent No.: US 8,511,713 B2
(45) Date of Patent: Aug. 20, 2013

(54) FLUID CONNECTION DEVICE

(75) Inventor: Adolf Henzler, Nürtingen (DE)

(73) Assignee: GL GmbH Metall—und Werkstatttechnik, Frickenhausen (DE)

( * ) Notice: Subject to any disclaimer, the term of this patent is extended or adjusted under 35 U.S.C. 154(b) by 14 days.

(21) Appl. No.: 13/389,400

(22) PCT Filed: Mar. 26, 2010

(86) PCT No.: PCT/EP2010/001909
§ 371 (c)(1),
(2), (4) Date: Feb. 7, 2012

(87) PCT Pub. No.: WO2011/018127
PCT Pub. Date: Feb. 17, 2011

(65) Prior Publication Data
US 2012/0133124 A1    May 31, 2012

(30) Foreign Application Priority Data
Aug. 13, 2009  (DE) .......................... 10 2009 037 078

(51) Int. Cl.
*F16L 17/00*    (2006.01)
(52) U.S. Cl.
USPC ........... 285/100; 285/109; 285/225; 285/235; 285/307; 251/149.6
(58) Field of Classification Search
USPC ................ 285/201, 369, 100–101, 107, 109, 285/225, 235, 307, 338, 354; 251/149.4, 251/149.6
See application file for complete search history.

(56) References Cited

U.S. PATENT DOCUMENTS

| | | | | |
|---|---|---|---|---|
| 1,383,209 A | * | 6/1921 | Iftiger | 251/149.6 |
| 2,272,890 A | * | 2/1942 | Bosomworth | 285/100 |
| 3,650,507 A | * | 3/1972 | Nyberg | 251/149.6 |
| 4,063,708 A | * | 12/1977 | Smith | 251/149.4 |
| 5,211,197 A | * | 5/1993 | Marrison et al. | 137/614.04 |
| 5,524,664 A | * | 6/1996 | Lin | 137/75 |
| 6,220,836 B1 | * | 4/2001 | Wu | 417/572 |
| 6,325,100 B1 | * | 12/2001 | Bunschoten et al. | 137/614.04 |
| 7,100,891 B2 | * | 9/2006 | Doyle | 251/149.6 |

FOREIGN PATENT DOCUMENTS

| | | |
|---|---|---|
| DE | 102007061753 A1 | 7/2009 |
| GB | 251595 A | 8/1926 |
| GB | 2280489 A | 2/1995 |
| WO | WO 02/079679 A1 | 10/2002 |

\* cited by examiner

*Primary Examiner* — Aaron Dunwoody
*Assistant Examiner* — Fannie Kee
(74) *Attorney, Agent, or Firm* — Leydig, Voit & Mayer, Ltd.

(57) ABSTRACT

A fluid connection device (1), comprising a tubular shaft (2), the interior of which is divided by a partition (8) into two partial spaces (6,9) separated from each other. A respective side opening (11,12) opens into each of the two partial spaces. The side openings are covered by an elastomeric sleeve (3) so that the side openings are sealed shut as long as no other external forces act on the sleeve. By means of a union nut (4), which is intended to connect the tubular shaft to a container and is screwed onto the fitting thereof, the sleeve is compressed in the axial direction and produces an annular gap that extends across the side openings, by means of which the side openings are flow-connected from then on.

12 Claims, 3 Drawing Sheets

FLUID CONNECTION DEVICE

CROSS-REFERENCE TO RELATED APPLICATIONS

This patent application is the national phase of PCT/EP2010/001909, filed Mar. 26, 2010, which claims the benefit of German Patent Application No. 102009037078.1, filed Aug. 13, 2009.

FIELD OF THE INVENTION

The present invention relates generally to a fluid connection device adapted for facilitating the dispensing of liquids from a liquid containing canister or the like into a receiving tank.

BACKGROUND OF THE INVENTION

Tanks are usually refilled by simple pouring. However, when the liquid is one that has a strong odor or is dangerous to health, the refilling must take place so that as much as possible vapors cannot escape. An example of this is the refilling of the liquid that is used in an SCR (selected catalytic reduction) process in diesel engines. This process is also known as "Bluetec." The liquid that is used in this case has the trade name "AdBlue." It is a 32.5% aqueous urea solution. The process is used to reduce the $NO_x$ fraction in exhaust gas and to convert nitrogen oxides to nitrogen and water. The fluid connection device used during tank refilling must be able to be made economically so that it can be discarded together with the canister from which the liquid is refilled.

OBJECTS AND SUMMARY OF THE INVENTION

The fluid connection device according to an embodiment of the invention has a tubular shaft which has at least two side openings adjacent to each other in the lengthwise direction of the shaft. There is no flow-through connection between the two side openings within the tubular shaft since a partition is provided between the openings. The two side openings can only be flow-connected to each other through the outside of the shaft.

On the outside of the tubular shaft there is an elastomeric sleeve that surrounds the shaft at the level of the two side openings. In an unconnected state of the connection device, the sleeve lies against the side openings and seals them so that at least one, and preferably every side opening, is sealed.

The elastomeric sleeve is compressible in the lengthwise direction. Upon axial compression, there arises, between the outside of the shaft and the inside of the sleeve, an outwardly sealed annular gap or space which enables a fluid connection between the two side openings.

In addition, a compression device is provided in order to compress the sleeve in the lengthwise direction when required. When the fluid connection device is used, a canister, for example, connected to one side of the shaft is sealed shut until the sleeve is compressed. By then inserting the shaft into the tank that is to be refilled with the liquid from the canister, and with the sleeve compressed in the axial direction, the liquid flows from the canister through the shaft to one of the side openings, from there through the annular or ring gap to the other side opening, and from there it flows further through the tubular shaft into the tank that is to be refilled.

The force needed to compress the sleeve sufficient to produce the ring gap can be reduced if the tubular shaft has a barrel-shaped crown in the region of the side openings. In that arrangement, the sleeve is more easily deformed and buckled in the desired fashion when an axial force is exerted. It can be advantageous if the greatest diameter of the barrel-shaped crown is at the level of the partition between the side openings, i.e., approximately in the middle between the side openings.

For a given length of the side openings in the axial direction, the cross section of the side openings can be increased if the side openings have an oblong shape and the longer length lies in the circumferential direction.

The force needed to compress the sleeve in the axial direction so that it uncovers the openings can be reduced further if the inner side of the elastomerie sleeve corresponds in shape to the crown of the shaft. The seal in the compressed state also can be improved if the sleeve is provided with annular beads at its ends that fit tightly on the shaft under the appropriate radial prestress.

In order to direct air displaced from the tank in a refilling operation back into the canister, the partition can contain a through opening. A ventilation hose can be positioned through this through opening while maintaining a seal.

Apart from the crown, the shaft can be essentially cylindrical. It can have a cylindrical continuation on both sides of the crown, and the diameters of the cylindrical sections at the ends of the crown can be the same.

A stop for axial compression of the sleeve can be a collar that is arranged on the outside of the shaft at a distance from one of the side openings. The compression device can also have a union nut, and to prevent excessive tightening of the union nut, it can be provided with a stop. The union nut and the shaft can be injection molded from a suitable plastic that has sufficient strength. Examples of suitable plastics are: PEHD, PA 66-GF35.

Other objects and advantages of the invention will become apparent upon reading the following detailed description and upon reference to the drawings, in which:

Figure 1:
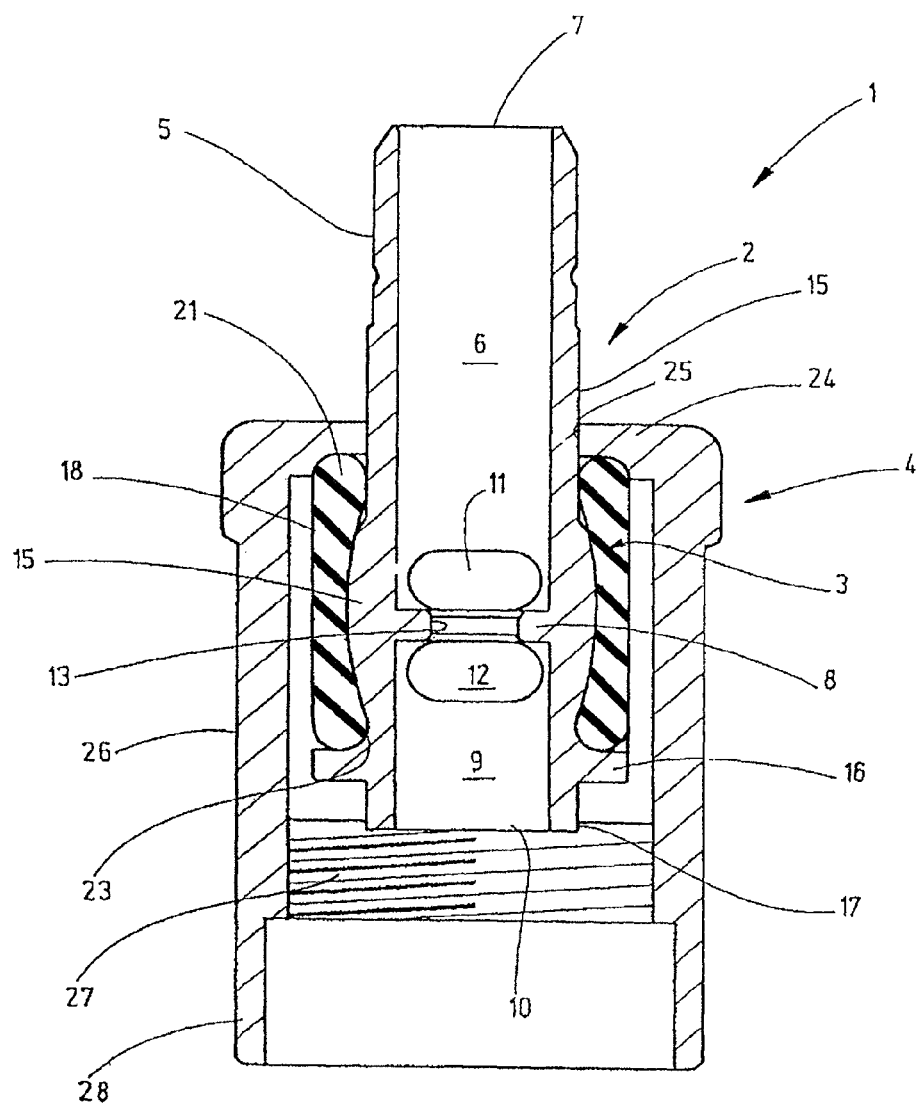
FIG. 1 is a longitudinal section of a fluid connection device in accordance with the invention, shown in a closed state.

While the invention is susceptible of various modifications and alternative constructions, a certain illustrative embodiment thereof has been shown in the drawings and will be described below in detail. It should be understood, however, that there is no intention to limit the invention to the specific form disclosed, but on the contrary, the intention is to cover all modifications, alternative constructions, and equivalents falling within the spirit and scope of the invention.

The following description of the figures explains aspects for an understanding of the invention. One skilled in the art can as usual learn additional details that are not described from the drawings, which in this respect supplement the description of the figures. It is clear that a number of modifications are possible.

The drawings are not absolutely to scale. To illustrate details some regions may be represented in a magnified view. Moreover, the drawings are broadly simplified and do not contain every detail that may be present in the practical execution. The terms "above" and "below" or "left" and "right" refer to the representation in the figures.

DESCRIPTION OF THE PREFERRED EMBODIMENTS

Referring now more particularly to the drawings, there is shown an illustrative fluid connection device 1 in accordance with the invention. The illustrated fluid connection device includes a tubular shaft 2, a sleeve 3 consisting of an elastomeric material, and a union nut 4. The material for the sleeve 3 may be, for example, EPDM.

The tubular shaft 2 has an essentially cylindrical shape with a cylindrical outer wall 5. Within the shaft 2 there is a first cylindrical internal space 6 that extends between an upstream opening 7 and a partition 8. On the opposite side of the partition 8 there is another cylindrical internal space 9, which extends from the partition 8 to a downstream opening 10. In the region of the upper cylindrical internal space 6, the part of the shaft 2 that is adjacent to the opening 7 is formed as a hose connection.

Figure 3:
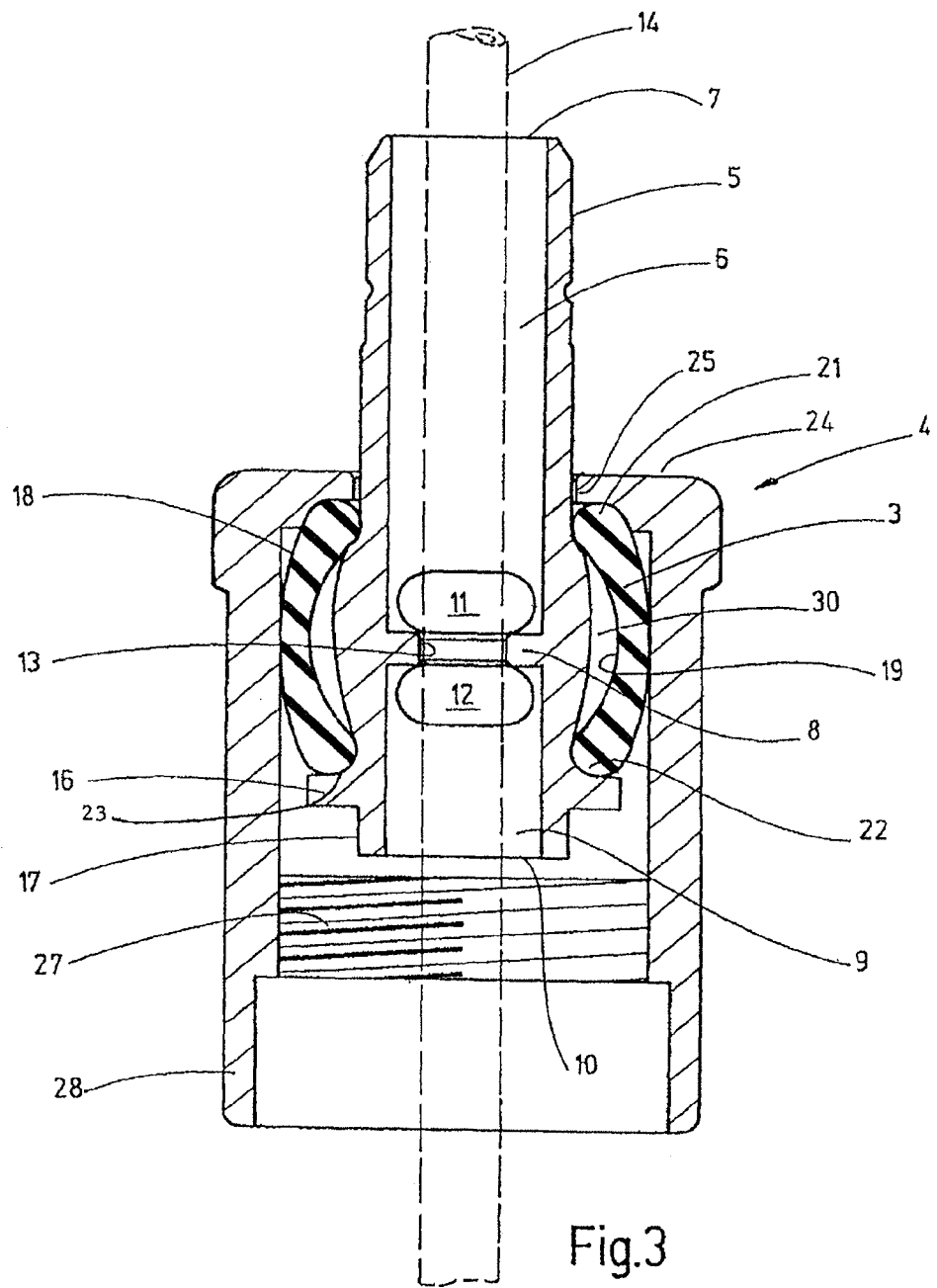
FIG. 3 is a longitudinal section of the fluid connection device shown in FIG. 1 in an operative state with fluid communicating through the device.

Above the partition 8 the wall of the tubular shaft 2 contains two diametrically opposed openings 11 of which only one of the openings 11 can be seen because of the sectional representation. The openings 11 have an oval shape and extend with their longer axis in the circumferential direction of the tubular shaft 2. Under the partition 8 there are two additional side openings 12, which likewise have an oval shape and have their longer axis in the circumferential direction. The partition 8 contains a cylindrical through-opening 13 through which a ventilation hose 14 is positioned in a leak-tight manner, as shown in FIG. 3.

In the region of the two side openings 11, 12, the cylindrical shaft 6 is formed with a barrel-shaped crown 15, whose thickest point lies approximately at the level of the partition 8. The generating line of the crown 15 is an arc of a circle. The length of the barrel-shaped crown is shorter than that of the shaft 2 with cylindrical sections remaining above and below. The side openings 11, 12 extend go to the outer surface of the barrel-shaped crown 15.

Below the barrel-shaped crown 14 there is a circumferential collar 16, which serves as a support for the sleeve. The cylindrical outer wall 5 continues after the collar 16 in the form of a cylindrical section 17.

Figure 2:
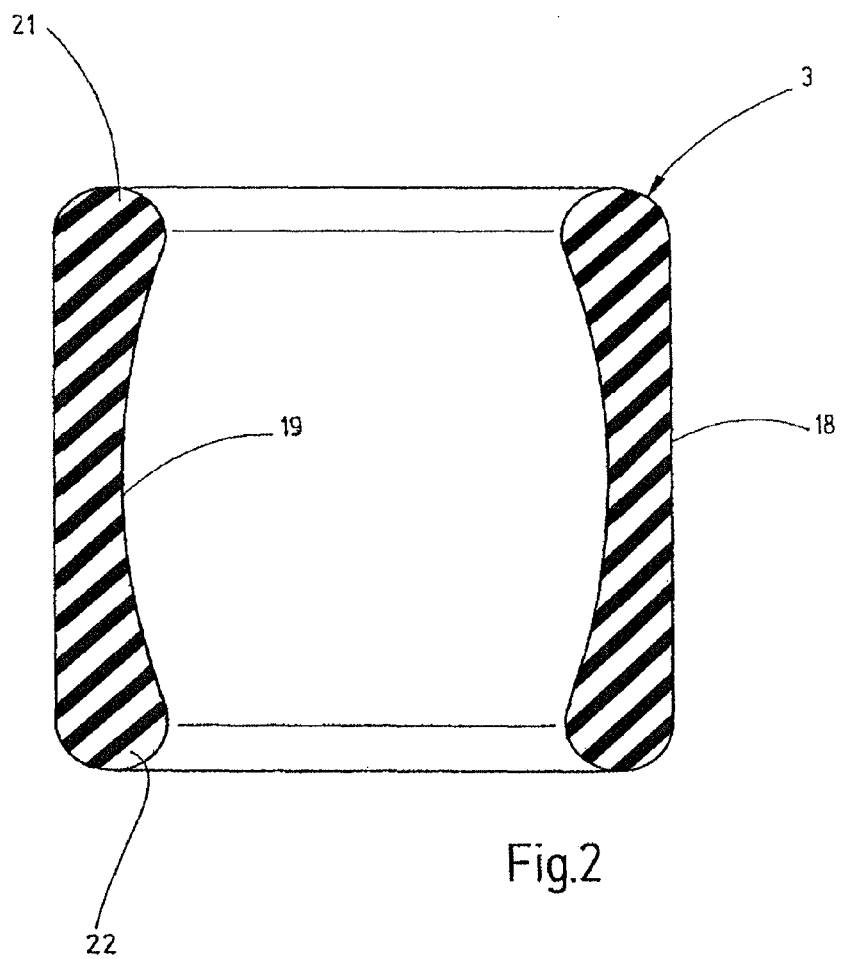
FIG. 2 is an enlarged longitudinal section of an outer sleeve of the fluid connection device shown in FIG. 1.

The sleeve 3 is made of an elastomeric material and has the shape shown in FIG. 2. It is bounded on the outside by a cylindrical circumferential surface 18 and on the inside by a barrel-shaped surface 19. The barrel-shaped surface 19 corresponds roughly in its shape to the barrel-shaped crown 15. Both axial ends the sleeve make a smooth tangential transition on the inner surface 19 to surrounding beads 21, 22, respectively. The sleeve 3 is dimensioned so that when it is positioned on the barrel-shaped crown 15, it seals the side openings 11, 12. The diameter of the inner surface 19 is a slightly smaller than the outside diameter of the barrel-shaped crown 15 at all points so that the sleeve 3 lies over the entire surface of the barrel-shaped crown 3 while producing a radial prestress. In the axial direction, the barrel-shaped crown 15 is slightly shorter than the longitudinal spacing of the beads 21, 22 from each other so that the bead 21 can slip to some extent on the cylindrical outer surface 5 before it reaches the region of the barrel-shaped crown 15. The lower end of the sleeve 3 with the bead 22, on the other hand, rests directly on the collar 16, which has a rounded fillet 23 that transitions into the crown 15.

The union nut 4 serves as a compression device for the sleeve 3. The union nut 4 has a base 24 with a through opening 25 through which the upper cylindrical end of the tubular shaft 2 passes.

The union nut 4 additionally comprises an appropriate cylindrical collar 26, whose inside diameter, as shown, is larger than the diameter of the sleeve 3. In the region of the lower end of the tubular shaft 2, the union nut 4 is provided with inside threads 27. A cylindrical continuation 28 is provided at the free end of the union nut 4 which has an inside diameter larger than the nominal diameter of the thread 27.

The functional use of the fluid connection device 1 can be understood with reference to FIG. 3.

When the union nut 4 is not screwed onto a spout of the tank that is to be refilled, it does not generate any pressure in the axial direction on the sleeve 3. The sleeve 3 is relaxed in the axial direction and lies tightly against the total of four side openings 11, 12. At the upper end of the tubular shaft 2, a hose can be connected, which leads to the canister from which the liquid is to be dispensed. This hose connecting the dispensing canister to the sleeve preferably has a larger diameter than the opening 25. The connecting hose, having a larger diameter than the opening 25, further acts as a stop that keeps the union nut 4 from becoming misplaced. In addition, another cover (not shown) can be inserted as protection to keep soil from getting into the bottom cylindrical continuation 28. Since the sleeve 3 lies tightly on the barrel-shaped crown 15, the upper internal space 6, which may be filled with the refill liquid, is blocked off and the liquid cannot pass through the two side openings 11.

To refill liquid from the canister into a tank, the union nut 4 is screwed onto the corresponding tank connection, which is provided with an outside thread. The collar 16 is supported at the rim of the tank connection, while at the same time the union nut 4 is being screwed on. Since the tubular shaft 2, because of the engagement of the collar 16 at the tank connection, cannot follow the movement of the nut 4, the distance between the collar 16 and the base 24 of the union nut 4 becomes shorter. Through this reduction of distance the elastomeric sleeve 3 becomes buckled in the axial direction.

As the sleeve buckles it rests on the one end in the fillet 23 and on the other at the underside of the base 24. The upper bead 21 slides on the cylindrical outer surface 5 of the upper segment of the tubular shaft 2 until the bead 21 reaches the start of the barrel-shaped thickening or protuberance 15. Because of the axial buckling, the elastomeric sleeve 3 takes on a shape as shown in FIG. 3. In the middle region between the end beads 21 and 22, it is lifted out from the barrel-shaped crown 15. It forms an annular or ring gap 30, which in cross section is sickle shaped and is sealed above and below by the beads 21, 22 that rest against the cylinder wall 5. The two side openings 11 lying above the partition 8 and the two side openings lying under the partition wall 8 open into this ring gap 30. The side openings 11 lying above the partition 8 are in thus flow communication with the side openings 12 that are under the partition through the annular gap 30 so that a flow communication arises between the internal space 6 and the cylindrical internal space 9. The medium to be refilled can now flow from the canister through the connecting hose into the upper end of the tubular shaft 2.

At the lower end of the upper internal space 6, the medium flows through the side openings 11 into the ring gap 30 and from there into the side openings 12. Through these side openings 12 the medium reaches the lower cylindrical internal space 9 and from there flows into the tank that is to be refilled. Since the air present in the tank must be displaced when it is refilled, the ventilation hose 14 is provided. The ventilation hose 14 goes into the supply canister and ends just under the lower opening 10 in the fluid connection device 1. The air to be displaced therefore flows above the liquid in the tank through the hose 14 into the canister. In this way no vapors or gases are displaced from the tank or the canister into the surrounding air. Rather the system remains externally unventilated during the refilling operation. The ventilation hose 14 is inserted into the through opening 13 so that no liquid can flow between the hose 14 and the wall of the through opening 13.

After the refilling operation is complete, the union nut is screwed off from the tank filler connection, due to which the axial force previously acting on the sleeve 3 is relieved. The sleeve 3 can relax in the lengthwise direction and lies tightly against the outer side of the barrel-shaped crown 15 and, as before, seals the side openings 11, 12.

From the foregoing, it can be seen that a fluid connection device is provided that has a tubular shaft, whose internal space is divided into two separate partial spaces by a partition. A side opening opens into each of the two partial spaces. The side openings are covered by an elastomeric sleeve, so that the side openings are sealed as long as no additional external forces act on the sleeve. By means of a union nut, which is provided to connect the tubular shaft to a container connection of which it is screwed, the sleeve becomes compressed in the axial direction and produces a ring gap extending over the side openings, via which the side openings now in flow-connected fluid communication.

The invention claimed is:

1. A fluid connection device comprising:
   a tubular shaft having at least two side openings that are adjacent to each other in a longitudinal direction of the shaft and which provide a fluid connection between an internal space of the shaft and an outside environment of the shaft,
   a partition disposed in an interior space of the shaft between the at least two side openings so that the internal space is divided into two separated sections,
   an elastomeric sleeve which surrounds and encloses the shaft at a level of the at least two side openings, said sleeve being compressible in the longitudinal direction, said elastomeric sleeve in a relaxed state lying tightly against the at least two side openings and in a compressed state forming with the shaft an annular gap outwardly of the at least two side openings that allows fluid communication between the two internal sections, and
   a compression device for compressing the sleeve in a lengthwise direction when desired for causing said sleeve to form said annular gap and enable fluid communicating between said internal sections.

2. The fluid connection device of claim 1, in which said tubular shaft has a barrel-shaped crown, and said at least two side openings are within said barrel-shaped crown.

3. The fluid connection device of claim 2, in which a largest diameter of said barrel-shaped crown lies, with respect to the longitudinal direction of the shaft, centrally between said at least two side openings.

4. The fluid connection device of claim 2, in which said elastomeric sleeve has an inner side shape that corresponds to the crown of the shaft.

5. The fluid connection device of claim 1, in which said at least two side openings have an oval shape with a length greater in a circumferential direction than in the longitudinal direction of the shaft.

6. The fluid connection device of claim 1, in which said sleeve has annular beads at opposite ends.

7. The fluid connection device of claim 1, in which said partition is formed with a through hole through which a ventilation hose extends.

8. The fluid connection device of claim 1, in which said compression device has a collar supporting said sleeve disposed an axial distance from the at least two side openings.

9. The fluid connection device of claim 1, in which said compression device includes a threaded union nut.

10. The fluid connection device of claim 9, in which said tubular shaft has a stop device that blocks excessive screwing of said nut onto a connection.

11. The fluid connection device of claim 9, in which said union nut has a threaded section and a cylindrical extension that projects beyond the threaded section.

12. The fluid connection device of claim 1, in which one end of said shaft has a hose connection.

* * * * *